US012730699B2

(12) United States Patent
Benhammadi

(10) Patent No.: US 12,730,699 B2
(45) Date of Patent: Sep. 8, 2026

(54) BUS ERROR MANAGEMENT METHOD

(71) Applicant: STMicroelectronics International N.V., Geneva (CH)

(72) Inventor: Jawad Benhammadi, Pont de Claix (FR)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/975,811

(22) Filed: Dec. 10, 2024

(65) Prior Publication Data

US 2025/0208941 A1 Jun. 26, 2025

(30) Foreign Application Priority Data

Dec. 22, 2023 (FR) ...................................... 2315216

(51) Int. Cl.
*G06F 11/07* (2006.01)

(52) U.S. Cl.
CPC ...... *G06F 11/0772* (2013.01); *G06F 11/0778* (2013.01); *G06F 11/0784* (2013.01); *G06F 11/0745* (2013.01)

(58) Field of Classification Search
CPC ............. G06F 11/0745; G06F 11/0772; G06F 11/0778; G06F 11/0784; G06F 11/0787; G06F 11/221; G06F 13/4027
See application file for complete search history.

(56) References Cited

U.S. PATENT DOCUMENTS 6,311,296 B1 * 10/2001 Congdon ............ G06F 11/0745 714/48
6,453,429 B1 * 9/2002 Sadana ............... G06F 11/0772 714/E11.026
6,523,140 B1 * 2/2003 Arndt ................. G06F 11/0772 714/43
10,915,389 B1 * 2/2021 BeSerra .............. G06F 11/0772
2007/0011500 A1 * 1/2007 Dasari ................ G06F 11/0745 714/100

(Continued)

FOREIGN PATENT DOCUMENTS

EP 2713273 A2 4/2014

OTHER PUBLICATIONS

"Microcontroller", Wikipedia, Nov. 2023, <https://en.wikipedia.org/w/index.php?title=Microcontroller&oldid=1183630520> (Year: 2023).*

(Continued)

*Primary Examiner* — Marc Duncan
*Assistant Examiner* — Albert Li
(74) *Attorney, Agent, or Firm* — Seed IP Law Group LLP

(57) ABSTRACT

The present description concerns a bus error management method, wherein one or a plurality of first characteristics of a first write transaction intended for a functional unit and transiting through a bridge, are stored, and wherein in the presence of a bus error sent by the functional unit: one or a plurality of second characteristics linked to said error are stored; the bridge generates a first interrupt that it transmits with said first and second characteristics to a management unit; and the management unit generates at least one second interrupt intended for a processing unit as a function of the first and/or second characteristics.

15 Claims, 5 Drawing Sheets

(56) References Cited

U.S. PATENT DOCUMENTS

| | | | | |
|---|---|---|---|---|
| 2007/0097871 | A1* | 5/2007 | Boyd | G06F 11/0724 370/242 |
| 2008/0016405 | A1* | 1/2008 | Kitahara | G06F 13/4045 714/43 |
| 2008/0148104 | A1* | 6/2008 | Brinkman | G06F 11/0793 714/E11.023 |
| 2013/0332925 | A1* | 12/2013 | Motai | G06F 11/0793 718/1 |
| 2017/0091013 | A1* | 3/2017 | Tallam | G06F 11/0745 |

OTHER PUBLICATIONS

Costan et al., "Intel SGX Explained," International Association for Cryptologic Research, vol. 20160812:222731, Aug. 2016, 118 pages.

* cited by examiner

BUS ERROR MANAGEMENT METHOD

CROSS REFERENCE TO RELATED APPLICATION(S)

This application claims the priority benefit of French patent application number FR2315216, filed on Dec. 22, 2023, entitled "Procédé de gestion d'erreurs de bus".

BACKGROUND

Technical Field

The present disclosure generally concerns bus error management methods as well as microcontrollers implementing these methods.

Description of the Related Art

Many electronic systems use central processing units (CPUs) generating write access transactions for functional units (Ips, Intellectual Property cores). Errors may occur during the implementation of these transactions.

BRIEF SUMMARY

There exists a need to improve the identification of the causes of errors resulting from a write access transaction.

An embodiment overcomes all or part of the disadvantages of known methods.

An embodiment provides a bus error management method,

- wherein one or a plurality of first characteristics of a first write transaction intended for a functional unit and transiting through a bridge, are stored,
- and wherein in the presence of a bus error sent by the functional unit:
  - one or a plurality of second characteristics linked to said error are stored;
  - the bridge generates a first interrupt that it transmits with said first and second characteristics to a management unit; and
  - the management unit generates at least one second interrupt intended for a processing unit as a function of the first and/or second characteristics.

An embodiment provides a microcontroller comprising at least one control unit, a bridge, a functional unit, and a management unit; the microcontroller being configured:

- to store one or a plurality of first characteristics of a first write transaction intended for the functional unit and transiting through the bridge; and
- so that in the presence of a bus error sent by the functional unit:
  - the bridge generates a first interrupt that it transmits with said first and second characteristics to a management unit; and
  - the management unit generates at least one second interrupt intended for a processing unit as a function of the first and/or second characteristics.

According to an embodiment, the processing unit executes a plurality of operating systems and the second interrupt is intended for one of these operating systems as a function of the first and/or second characteristics.

According to an embodiment, the second interrupt is intended for one among a plurality of processing units as a function of the first and/or second characteristics.

According to an embodiment, the first characteristics are stored in the bridge.

According to an embodiment, the second characteristics are stored in the bridge.

According to an embodiment, the management unit stores the first and second characteristics.

According to an embodiment, the management unit stores the first and second characteristics after the transmission of the first interrupt transaction and of the first and second characteristics by the bridge.

According to an embodiment, the first and second characteristics are stored in one or a plurality of the registers of the management unit.

According to an embodiment, the first characteristic(s) comprise an access restriction level.

According to an embodiment, the second characteristic(s) comprise an addressing mode restriction level.

According to an embodiment, the second characteristic(s) comprise an address.

According to an embodiment, the second characteristic(s) comprise an identifier.

According to an embodiment, one of the registers is configured to store a value representative of the presence of a transmission of the first interrupt transaction.

According to an embodiment, one of the registers is configured to store the first characteristic(s) as well as the second characteristic(s).

According to an embodiment, one of the registers is configured to store an address linked to the first write access transaction.

According to an embodiment, the management unit stores the first and second characteristics in registers having an access restriction level similar to the first characteristic(s).

According to an embodiment, the management unit transmits said second interrupt transaction to the processing unit having an access restriction level similar to the access restriction level associated with the first characteristic(s).

According to an embodiment, as a result of the transmission of the second interrupt transaction, the processing unit having received said second interrupt transaction performs an action from among a reconfiguring of the functional unit, a resetting of the first or of the second transaction, a resetting of the microcontroller, and a writing of an error report.

BRIEF DESCRIPTION OF THE SEVERAL VIEWS OF THE DRAWINGS

The foregoing features and advantages, as well as others, will be described in detail in the rest of the disclosure of specific embodiments given as an illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For clarity, only those steps and elements which are useful to the understanding of the described embodiments have been shown and are described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, where reference is made to absolute position qualifiers, such as "front," "back," "top," "bottom," "left," "right," etc., or relative position qualifiers, such as "top," "bottom," "upper," "lower," etc., or orientation qualifiers, such as "horizontal," "vertical," etc., reference is made unless otherwise specified to the orientation of the drawings.

Unless specified otherwise, the expressions "about," "approximately," "substantially," and "in the order of" signify plus or minus 10%, preferably of plus or minus 5%.

Figure 1:
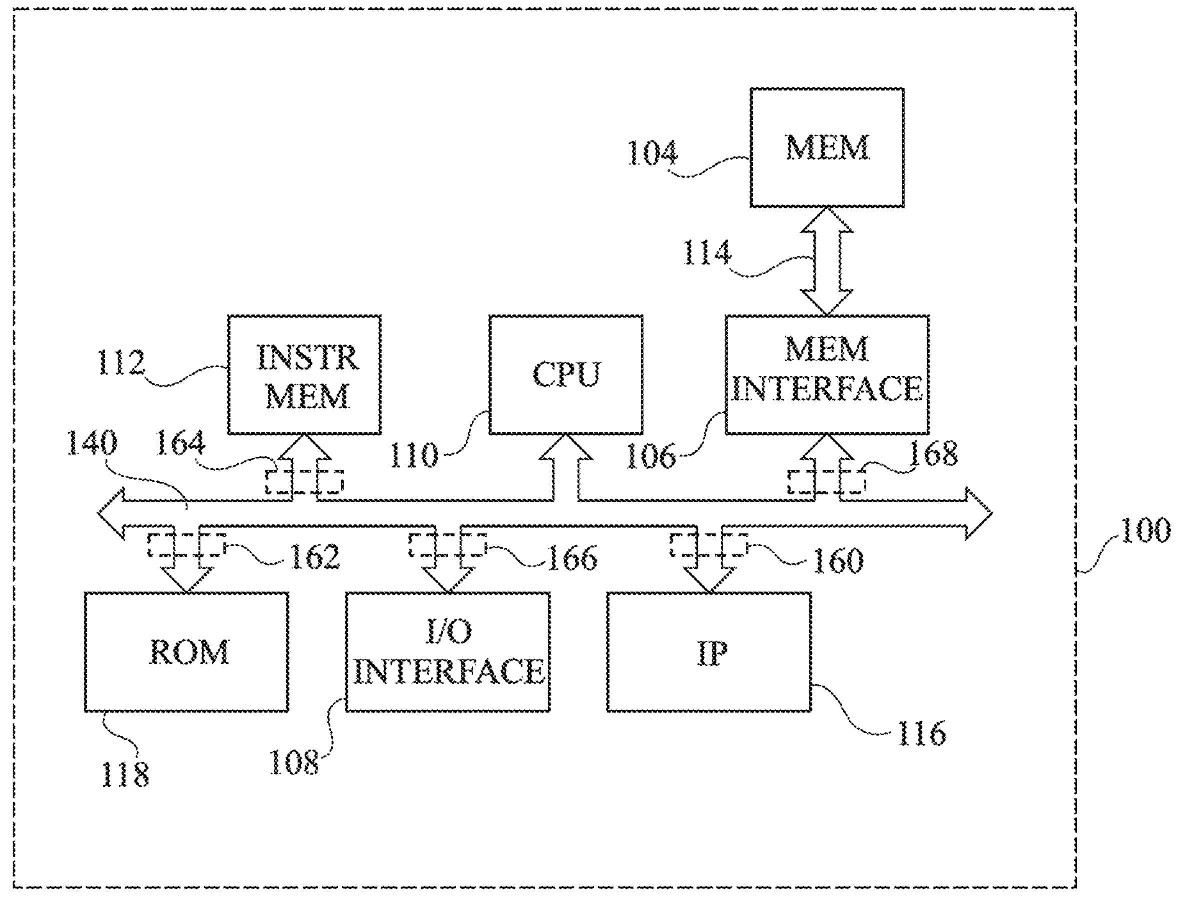
FIG. 1 shows, very schematically and in the form of blocks, an example of a microcontroller of the type to which the described embodiments apply.

FIG. 1 shows, very schematically and in the form of blocks, an example of a microcontroller 100 of the type to which the described embodiments apply. Microcontroller 100 is, for example, a microprocessor.

Microcontroller 100 comprises a non-volatile memory 104 (NVM), for example of phase-change type, capable of communicating, via a communication bus 114, with a non-volatile memory interface 106 (NVM INTERFACE) configured to write or read data into and from non-volatile memory 104.

Microcontroller 100 further comprises, for example, one or a plurality of processing units 110 (CPU) comprising one or a plurality of processors under control of instructions stored in an instruction memory 112 (INSTR MEM). The one or a plurality of processing units 110 comprise one or a plurality of operating systems (OS).

Instruction memory 112 is, for example, a volatile memory of random access (RAM) type. Processing unit 110 and memory 112 communicate, for example, via a system (data, address, and control) bus 140. Memory 104 is coupled to system bus 140 via non-volatile memory interface 106 and via bus 114. Device 100 further comprises an input/output interface 108 (I/O interface) coupled to system bus 140 to communicate with the outside.

Microcontroller 100 may integrate other circuits implementing other functions or functional units (for example, one or a plurality of volatile and/or non-volatile memories, direct memory accesses (DMA), or other processing units), symbolized by a block 116 (IP) in FIG. 1. Among these other circuits, microcontroller 100 comprises, for example, a read-only or static memory 118 (ROM).

Processing unit(s) 110 as well as blocks 104, 106, 108, 112, 114, 116, 118 are, for example, used in environments having different access restriction levels (NS, SEC). In an example, resources operating in the SEC environment have access to resources of level SEC or NS, while resources operating in the NS environment have access to resources of level NS but not of level SEC. In an example, an application defined to have access restriction level SEC, has more rights than an application with access restriction level NS. Access restriction levels SEC, NS are implemented, for example, with the TrustZone protocol of the ARM® CORTEX-M architecture.

In certain cases, the different blocks 104, 106, 108, 110, 112, 114, 116, 118 of FIG. 1 operate with different clock signal domains or under different protocols, such as AXI, AHB, or APB of the ARM® architecture. It is then necessary to implement one or a plurality of bridges (160, 162, 164, 166, 168), for example between processing unit(s) 110 and block 116, or one of blocks 118, 112, 108, or 106. These bridges ensure the transition from one operating mode, for example a bus protocol or a clock frequency domain, to another operating mode.

Processing unit(s) 110 generate and send write access transactions to one or a plurality of the different blocks 104, 106, 108, 112, 114, 116, 118 over bus 140 and, for example, by transiting through one of the bridges. During the passing through the bridge, the write access request transaction (Write bufferable access) is for example temporarily stored in the respective bridge. In an example, if the write access is unsuccessful, a bus error is generated, for example by the block receiving the write access transaction.

Figure 2:
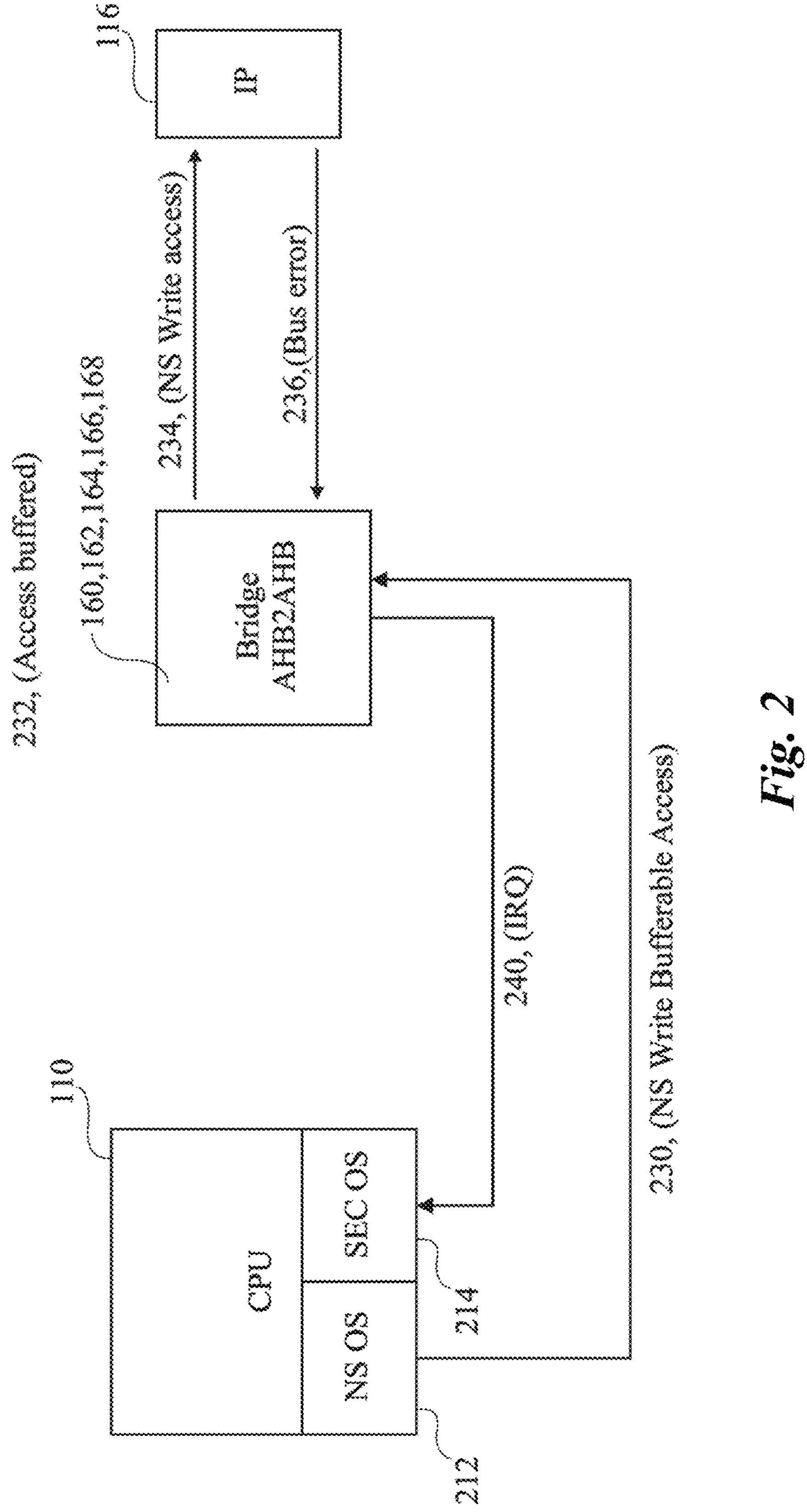
FIG. 2 shows an example of a bus error management method.

FIG. 2 shows an example of a bus error management method.

In the shown example, processing unit 110 comprises, for example, two operating systems, 214 (SEC OS) and 212 (NS OS). Operating system SEC OS has an access rights restriction level (secure, SEC) higher than that of operating system NS OS (non-secure, NS).

During a first step 230 (NS Write Bufferable Access), a write access transaction is generated by operating system 212, for example, for block 116. In this example, this transaction is implemented in an NS environment.

In a second step 232 (Access buffered), this transaction transits through the respective bridge (Bridge AHB2AHB) 160, 162, 164, 166, 168. In the shown example, the bridge adapts the transaction which is in AHB bus protocol to the same AHB protocol having, for example, a different clock signal domain, for example having a different frequency. In this step, the transaction is buffered, that is, temporarily stored, by the bridge. After this buffering, or from as soon as the end of first step 230, processing unit 110 for example performs other tasks, which are no longer related to the bridge.

In a third step 234 (NS Write access), the transaction is implemented from the bridge towards, for example, block 116.

As a response, in a fourth step 236 (Bus error), if the write access transaction fails, a bus error is sent from block 116 to bridge 160.

In a fifth step 240 (IRQ), on reception of this error, the bridge generates, that is, raises, an interrupt (IRQ, Interrupt ReQuest) intended for the default operating system 214 SEC OS and not for the operating system having the NS environment of the initial transaction. This is, for example, due to the fact that the bus error may be due to an attack and that, by default, interrupts are directed towards operating system 214. This interrupt may be software or hardware. The interrupt is materialized, for example, by the change of a bit or of a byte of a register. Operating system NS OS, having initiated the initial transaction, does not receive the bus error and thus cannot implement any remedial action or targeted action. The fact for processing unit 110 to have, as a result of the write access request transaction, performed other tasks which are no longer related to bridge 160, implies that none of the operating systems 214 SEC OS or 212 NS OS will receive the bus error. Operating system 214 SEC OS having no information other than the interrupt raised by the bridge, which might correspond to an attack, it will implement, for example, a full reset of microcontroller 100, which is detrimental to the user experience, for example.

Figure 3:
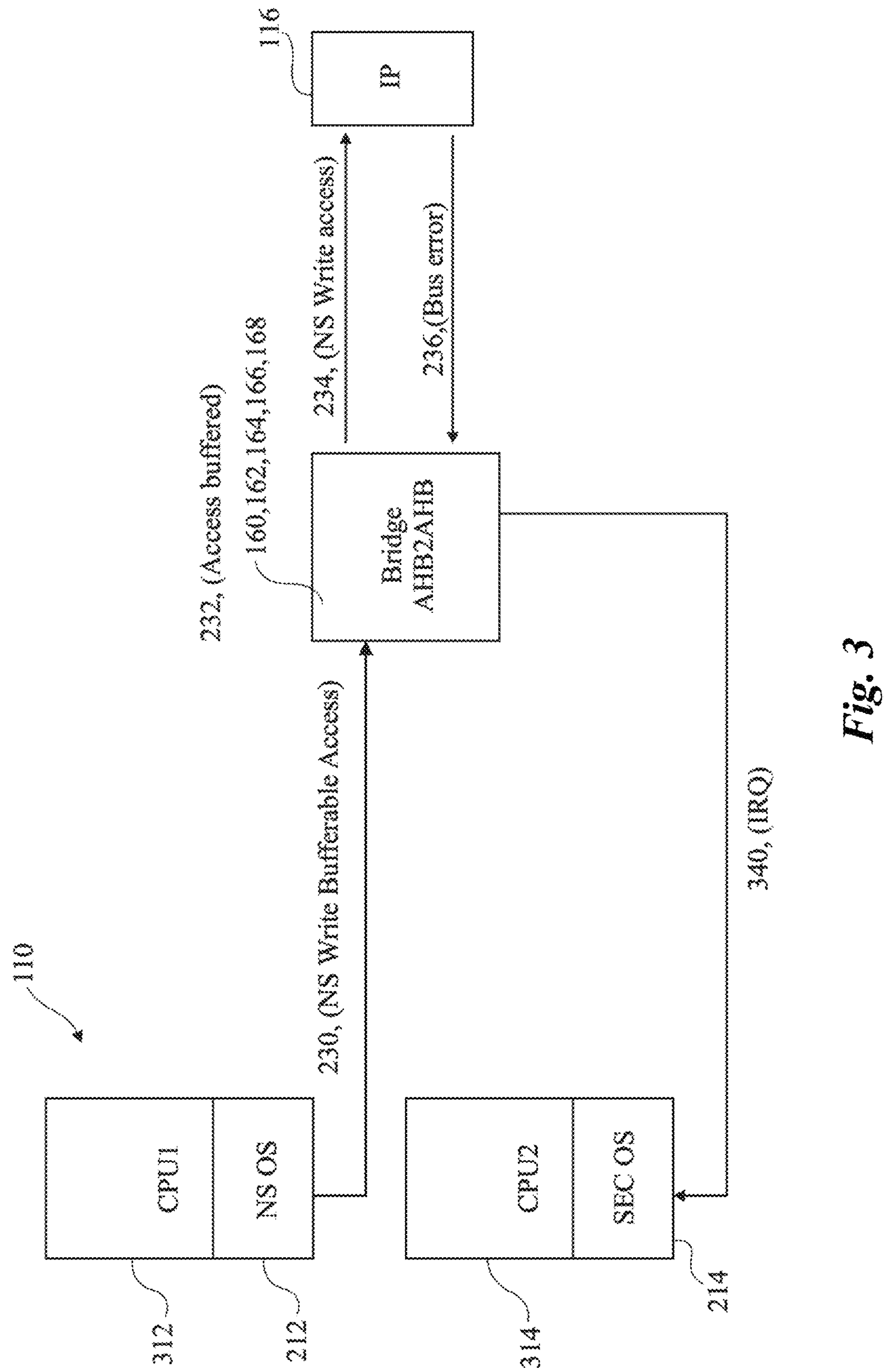
FIG. 3 shows another example of a bus error management method.

FIG. 3 shows another example of a bus error management method. The example of FIG. 3 is similar to that in the drawing except that, instead of having one processing unit implementing two operating systems under different environments, microcontroller 100 comprises two processing units 312 (CPU1) and 314 (CPU2) which respectively implement operating system 212 and operating system 214. In an example, processing unit 110 comprises two regions respectively containing processing units 312 and 314.

In the illustrated example, the write access transaction of step 230 is generated by operating system 212 under an NS environment. Steps 232, 234, and 236 are then similar to those of the example of FIG. 2.

After step 236, in a step 340 (IRQ), on reception of the bus error, bridge 160 generates by default an interrupt (IRQ) intended for the operating system 214 SEC OS of processing unit 314 and not for operating system 212 NS, which has the same NS environment as that of the initial transaction.

Further, operating system 212 NS OS, having initiated the initial transaction, does not receive the bus error and thus cannot implement any remedial action or targeted action. For the same reasons as the example of FIG. 2, none of operating systems 214 SEC OS or 212 NS OS will receive the bus error. Operating system 214 SEC OS having no information other than the interrupt raised by the bridge, it will, for example, implement a full reset of microcontroller 100.

To overcome these disadvantages, the described embodiments provide a bus error management method, in which one or a plurality of first characteristics of a first write transaction (write bufferable access) intended for functional unit 116 and transiting through bridge 160, are stored, and in which in the presence of a bus error sent by functional unit 116:
- one or a plurality of second characteristics linked to said error are stored;
- the bridge generates a first interrupt that it transmits with said first and second characteristics to a management unit; and
- the management unit generates at least one second interrupt intended for the processing unit (110, 312, 314) as a function of the first and/or second characteristics.

The operating system having initiated the initial transaction can thus access information relative to the bus error, and can thus implement remedial actions or targeted actions without having to fully reset the microcontroller.

The fact of storing the first and second characteristics enables to be able to produce an error report for the implementation of certifications such as the SESIP (Security Evaluation Standard for IoT Platforms) certification.

The operating system having issued the initial write access transaction, whether it has access restriction level NS or SEC, will be able to receive the second interrupt linked to this transaction.

Finally, an advantage of such a method is that it is possible to keep existing bridges without having to develop new ones.

Figure 4:
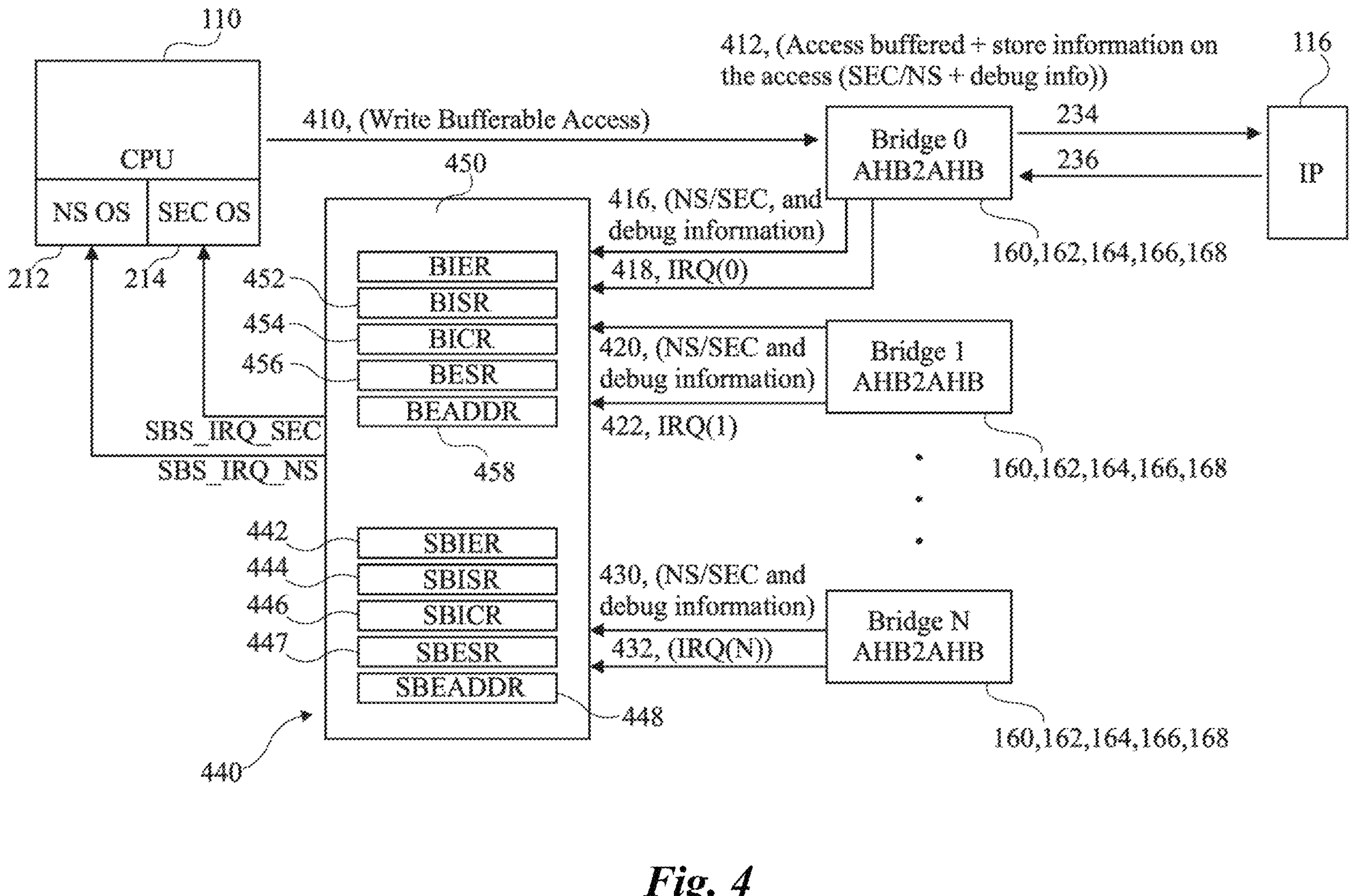
FIG. 4 shows a bus error management method according to an embodiment.

FIG. 4 shows a bus error management method according to an embodiment. The processing unit 110 of FIG. 4 is similar to that of FIG. 2.

In a first step 410 (NS Write Bufferable Access), a write access transaction is generated by operating system 212 for block 116, for example. In this example, this transaction is implemented in an NS environment. In the shown example, N write access transactions are generated, for example successively, by operating system 212, for example, for block 116 or other blocks and by respectively transiting at each write access transaction through N bridges (Bridge 0 AHB2AHB, Bridge 1 AHB2AHB, . . . , Bridge N AHB2AHB).

In a second step 412 (Access buffered+store information on the access (SEC/NS+debug info)), this transaction transits through a respective bridge (Bridge 0 AHB2AHB) 160, 162, 164, 166, 168. In the shown example, the bridge adapts the transaction which is in AHB bus protocol to the same AHB protocol having, for example, a different clock signal domain, for example, of different frequency. In this step, the transaction is buffered, that is, temporarily stored, by the bridge. After this buffering or from as soon as the end of first step 410, processing unit 110 performs, for example, other tasks which are no longer related to the bridge. During this step, one or a plurality of first characteristics of the write transaction, in other words, of the write access, are stored, for example in the bridge. These first characteristics are, for example, representative of the access restriction level (NS/SEC) linked to the transaction environment. The first characteristics may also comprise information useful for debugging.

In a third step similar to step 234, the write access transaction is implemented from the respective bridge towards, for example, block 116.

As a response, in a fourth step similar to step 236 (Bus error), if the write access transaction fails, a bus error possibly accompanied by one or a plurality of second characteristics is sent from block 116 to the respective bridge. During this step, one or a plurality of second characteristics related to this error are stored, for example, in the respective bridge. These second characteristics for example comprise an addressing mode restriction level (unpriv, Priv), an address, or also an identifier of master or slave functions.

In a fifth step 416, 420, 430 (NS/SEC, and debug information), after reception of the respective bus error, each bridge generates an interrupt 418 IRQ(0), 422 IRQ(1) . . . 432 IRQ(N) that it transmits, for example with the first and second characteristics, to a management unit 440. Management unit 440 is, for example, a smart bridge system (SBS).

In the shown example, the management unit comprises registers 450 (BIER), 452 (BISR), 454 (BICR), 456 (BESR), and 458 (BEADDR) dedicated to the storage of the characteristics among the first and second ones which follow a write access transaction of access restriction level NS, and different registers 442 (SBIER), 444 (SBISR), 446 (SBICR), 447 (SBESR), and 448 (SBEADDR) dedicated to the storage of the characteristics which follow a write access transaction of access restriction level SEC. In other words, if the access restriction level NS/SEC of the operating system, or the environment, which has generated the transaction at step 410 is of NS type, then the first and second characteristics transmitted by the respective bridge are stored in management unit 440 in the registers associated with this same access restriction level NS, the same applying for level SEC.

In a sixth step subsequent to the fifth step, management unit 440 generates at least one second interrupt (SBS_IRQ_NS, SBS_IRQ_SEC) intended for processing unit 110 based on the first and/or second characteristics stored in one or a plurality of the bridges and/or in management unit 440.

If the interrupt, generated by one of the bridges and stored, for example, via a flag raised in one of the registers of management unit 440, is initially linked to a transaction with an access restriction level NS, then the second interrupt SBS_IRQ_NS is sent from management unit 440 to operating system 212. If the interrupt is initially linked to a transaction having an access restriction level SEC, then the second interrupt SBS_IRQ_SEC is sent from management unit 440 to operating system 214.

This second interrupt may contain, for example, the access restriction level NS/SEC of the initial transaction, but also the second characteristics linked to the corresponding bus error.

Register 450 is, for example, read- and write-only in the case where the access restriction level is NS. In an example, certain bits or bytes of register 450 are written by software means to enable or disable the second interrupt SBS_IRQ_NS. A 0 value means that this second interrupt SBS_IRQ_NS is disabled and that, in this case, the second interrupt will not reach the concerned processing unit when a first interrupt will have been initiated by a bridge. A 1 value means that the second interrupt SBS_IRQ_NS is active, and in this case the interrupt will be transmitted all the way to the concerned processing unit when an interrupt will have been initiated by a bridge.

Register 452 is, for example read-only in the case where the access restriction level is of NS type. In an example, a bit or byte of register 452 is dedicated to the storage of the flag linked to the raising of the second interrupt SBS_IRQ_NS. A 1 value indicates, for example, that interrupt SBS_IRQ_NS has been transmitted all the way to the concerned processing unit. A value of the flag at 0 indicates, for example, that interrupt SBS_IRQ_NS has not reached the concerned processing unit.

Register 454 is for example write-only in the case where the access restriction level is NS. In an example, a 1 value clears the flag linked to the interrupt stored in register 452 and also clears registers 456 and 458. In an example, writing 0 has no effect.

Register 456 is, for example, read-only in the case where the access restriction level is NS. It stores the characteristics associated with the write access request transaction having access restriction NS. This register is for example valid only when the respective bridge has generated an interrupt associated with access restriction NS, that is, when a flag is raised. In an example, certain bits or bytes of register 456 are dedicated to the storage of the identifier of the bridge having transmitted the interrupt. Certain bits or bytes of register 456 are for example dedicated to the storage of the addressing mode restriction level (unpriv, Priv) of the functional unit or of the bridge or of the operating system having issued the transaction. Certain bits or bytes of register 456 are for example dedicated to the storage of the identifier of the master/slave element or of the functional unit.

Register 458 is for example read-only in the case where the access restriction level is NS. This register 458 is, for example, written by hardware means when a bridge raises an error. It is for example reset by software means via register 454. It for example stores the address of the write access request transaction having access restriction level NS which has generated the bus error.

Registers 442, 444, 446, 447, and 448 are respectively similar to registers 450, 452, 454, 456, and 458, except that the criteria of the parameters of access restriction level NS are replaced by access restriction level SEC.

The processing unit or the operating system receiving the second interrupt may, for example, use the first and second characteristics stored in the corresponding bridge or in the registers of management unit 440 or in the second interrupts to feed an error report and/or implement specific actions. These actions are for example the reconfiguring of the functional block 116 having generated the bus error or the restarting of the initial transaction, or also the resetting of all or part of the microcontroller.

Figure 5:
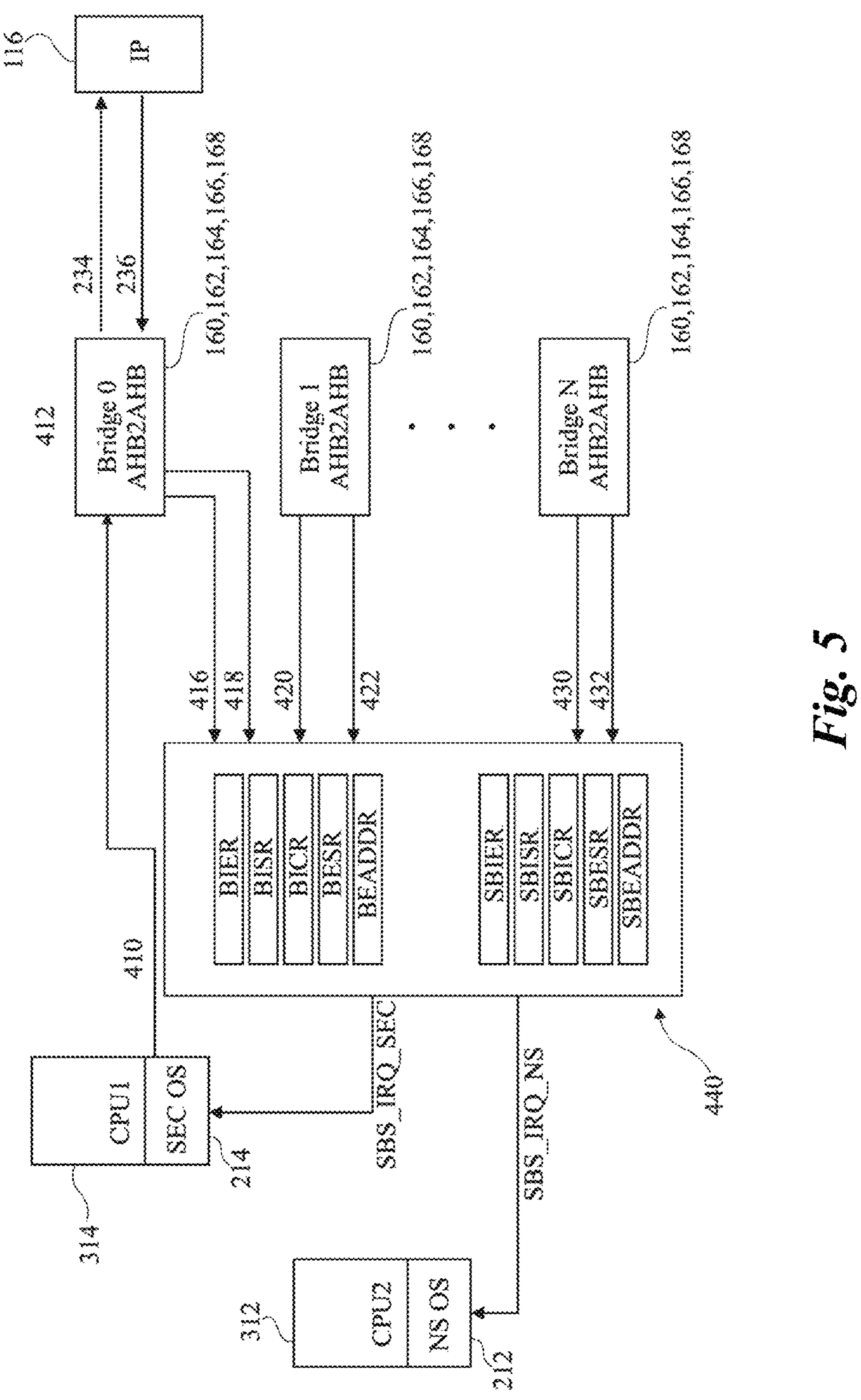
FIG. 5 shows a bus error management method according to another embodiment.

FIG. 5 shows a bus error management method according to another embodiment.

The method of FIG. 5 is similar to that of FIG. 4 except that, at the step 410 of FIG. 5, the write access transaction is transmitted by an operating system similar to operating system 214, which has access restriction level SEC, or by an operating system similar to operating system 212, which has access restriction level NS.

In the sixth step, the second interrupt generated by management unit 440 (SBS_IRQ_NS,SBS_IRQ_SEC) is either intended for the operating system 212 of processing unit 312, or for the operating system 214 of processing unit 314, as a function of the first and/or second characteristics stored in one or a plurality of the bridges and/or in management unit 440.

Various embodiments and variants have been described. Those skilled in the art will understand that certain features of these various embodiments and variants may be combined, and other variants will occur to those skilled in the art. In particular, other types of registers may be implemented in management unit 440 to store other types of characteristics which could help the resolution of problems linked to bus errors.

Finally, the practical implementation of the described embodiments and variants is within the abilities of those skilled in the art based on the functional indications given hereabove. In particular, regarding access restriction level NS/SEC, those skilled in the art will be able to implement the storage in the bridge(s) or in the management unit 440 of other characteristics such as an addressing restriction level priv/unpriv of the operating system having issued the initial transaction. In an example, the bridge(s) may be integrated to the management unit to facilitate the storage and the transmission of the characteristics of the write access transactions, but also of characteristics linked to bus errors.

A bus error management method can include: storing one or a plurality of first characteristics of a first write transaction (410) intended for a functional unit (116) and transiting through a bridge (160, 162, 164, 166, 168); and in the presence of a bus error sent by the functional unit (116): storing one or a plurality of second characteristics linked to said error; generating, by the bridge (160, 162, 164, 166, 168), a first interrupt (416, 420, 422, 430) that it transmits with said first and second characteristics to a management unit (440); and generating, by the management unit (440), at least one second interrupt (SBS_IRQ_NS, SBS_IRQ_SEC) intended for a processing unit (110, 312, 314) as a function of the first and/or second characteristic(s).

A microcontroller (100) can include at least one control unit (110, 312, 314), a bridge (160, 162, 164, 166, 168), a functional unit (116), and a management unit (440); the microcontroller (100) being configured to: store one or a plurality of first characteristics of a first write transaction (410) intended for the functional unit (116) and transiting through the bridge (160, 162, 164, 166, 168); and in the presence of a bus error sent by the functional unit (116): the bridge generates a first interrupt (416, 420, 422, 430) that it transmits with said first and second characteristics to the management unit (440); and the management unit generates at least one second interrupt (SBS_IRQ_NS, SBS_IRQ_SEC) intended for a processing unit (110, 312, 314) as a function of the first and/or second characteristic(s).

The processing unit can execute a plurality of operating systems (212, 214) and the second interrupt can be intended for one of these operating systems as a function of the first and/or second characteristic(s).

The second interrupt can be intended for one among a plurality of processing units (312, 314) as a function of the first and/or second characteristic(s).

The first characteristic(s) can be stored in the bridge (160, 162, 164, 166, 168).

The second characteristic(s) can be stored in the bridge (160, 162, 164, 166, 168).

The management unit (440) can store the first and second characteristic(s).

The management unit (440) can store the first and second characteristic(s) after the transmission of the first interrupt transaction (416, 420, 422, 430) and of the first and second characteristic(s) by the bridge.

The first and second characteristic(s) can be stored in one or a plurality of registers of the management unit (440).

The first characteristic(s) can include an access restriction level (NS, SEC).

The second characteristic(s) can include an addressing mode restriction level (unpriv, Priv).

The second characteristic(s) can include an address.

The second characteristic(s) can include an identifier.

One of the registers can be configured to store a value representative of the presence of a transmission of the first interrupt transaction (416, 420, 422, 430).

One of the registers can be configured to store the first characteristic(s) as well as the second characteristic(s).

One of the registers can be configured to store an address linked to the first write access transaction (410).

The management unit (440) can store the first and second characteristic(s) in registers having an access restriction level (NS, SEC) similar to the first characteristic(s).

The management unit (440) can transmit said second interrupt transaction (SBS_IRQ_NS, SBS_IRQ_SEC) to the processing unit (110, 312, 314) having an access restriction level (NS, SEC) similar to the access restriction level (NS, SEC) associated with the first characteristic(s).

As a result of the transmission of the second interrupt transaction (SBS_IRQ_NS, SBS_IRQ_SEC), the processing unit (110, 312, 314) having received said second interrupt transaction can perform an action from among a reconfiguring of the functional unit (116), a resetting of the first or of the second transaction, a resetting of the microcontroller (100), and a writing of an error report.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments. To the extent that the various patents, applications and publications conflicts with the present disclosure, the present disclosure controls.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A bus error management method, comprising storing one or a plurality of first characteristics of a first write transaction intended for a functional unit and transiting through a bridge;

and in the presence of a bus error sent by the functional unit:

storing one or a plurality of second characteristics linked to the error;

generating, by the bridge, a first interrupt that it transmits with the first characteristics and second characteristics to a management unit; and generating, by the management unit, at least one second interrupt intended for a processing unit as a function of at least one of the first or second characteristics, wherein the management unit stores the first characteristics and second characteristics after the transmission of the first interrupt and of the first characteristics and second characteristics by the bridge.

2. The method according to claim 1, wherein the processing unit executes a plurality of operating systems and the second interrupt is intended for one of the plurality of operating systems as a function of at least one of the first characteristics or second characteristics.

3. The method according to claim 1, wherein the second interrupt is intended for one among a plurality of processing units as a function of at least one of the first characteristics or second characteristics.

4. The method according to claim 1, wherein the first characteristics are stored in the bridge.

5. The method according to claim 1, wherein the second characteristics are stored in the bridge.

6. The method according to claim 1, wherein the first characteristics comprise an access restriction level.

7. The method according to claim 1, wherein the second characteristics comprise an addressing mode restriction level.

8. The method according to claim 1, wherein the second characteristics comprise an address.

9. The method according to claim 1, wherein the second characteristics comprise an identifier.

10. The method according to claim 1, wherein, as a result of the transmission of the second interrupt, the processing unit having received the second interrupt performs an action including at least one of a reconfiguring of the functional unit, a resetting of the first write transaction, a resetting of a microcontroller, or a writing of an error report.

11. A microcontroller comprising at least one control unit, a bridge, a functional unit, and a management unit; the microcontroller being configured to:

store one or a plurality of first characteristics of a first write transaction intended for the functional unit and transiting through the bridge; and in the presence of a bus error sent by the functional unit:

the bridge generates a first interrupt that it transmits with the first characteristics and second characteristics to the management unit; and the management unit generates at least one second interrupt intended for a processing unit as a function of at least one of the first or second characteristics, wherein the management unit stores the first characteristics and second characteristics after the transmission of the first interrupt and of the first characteristics and second characteristics by the bridge.

12. A bus error management method, comprising:

storing one or a plurality of first characteristics of a first write transaction intended for a functional unit and transiting through a bridge;

and in the presence of a bus error sent by the functional unit:

storing one or a plurality of second characteristics linked to the error;

generating, by the bridge, a first interrupt that it transmits with the first and second characteristics to a management unit; and generating, by the management unit, at least one second interrupt intended for a processing unit as a function of at least one of the first or second characteristics, wherein the first characteristics and second characteristics are stored in one or a plurality of registers of the management unit and wherein the management unit performs at least one of:

storing the first and second characteristics in registers having an access restriction level similar to an access restriction level associated with the first characteristics, or transmitting the second interrupt to the processing unit having an access restriction level similar to the access restriction level associated with the first characteristics.

13. The method according to claim 12, wherein one of the registers is configured to store a value representative of the presence of a transmission of the first interrupt.

14. The method according to claim 12, wherein one of the registers is configured to store the first characteristics and the second characteristics.

15. The method according to claim 12, wherein one of the registers is configured to store an address linked to the first write transaction.

* * * * *